US010183813B2

(12) United States Patent
Lundgren et al.

(10) Patent No.: US 10,183,813 B2
(45) Date of Patent: Jan. 22, 2019

(54) CARTON FEEDER DEVICE AND METHOD FOR FEEDING A CARTON TO A CONVEYOR TRACK

(75) Inventors: Christer Lundgren, Kalmar (SE); Jan Nilsson, Kalmar (SE)

(73) Assignee: Nordon Machinery AB, Kalmar (SE)

( * ) Notice: Subject to any disclaimer, the term of this patent is extended or adjusted under 35 U.S.C. 154(b) by 25 days.

(21) Appl. No.: 13/643,025

(22) PCT Filed: Apr. 26, 2011

(86) PCT No.: PCT/SE2011/050497
§ 371 (c)(1),
(2), (4) Date: Jan. 14, 2013

(87) PCT Pub. No.: WO2011/136725
PCT Pub. Date: Nov. 3, 2011

(65) Prior Publication Data
US 2013/0121799 A1    May 16, 2013

(30) Foreign Application Priority Data
Apr. 27, 2010  (SE) ........................................ 1050418

(51) Int. Cl.
*B31B 1/80* (2006.01)
*B65G 47/04* (2006.01)
(Continued)

(52) U.S. Cl.
CPC ............ *B65G 47/04* (2013.01); *B65B 43/265* (2013.01); *B65B 43/305* (2013.01); *B31B 50/786* (2017.08);
(Continued)

(58) Field of Classification Search
CPC .... B31B 1/80; B31B 1/78; B31B 5/76; B31B 5/80; B31B 2203/003; B31B 2201/287
(Continued)

(56) References Cited

U.S. PATENT DOCUMENTS 3,242,827 A  *  3/1966  Winters ................ B65B 43/305
                                                271/132
3,633,470 A      1/1972  Bingham
(Continued)

FOREIGN PATENT DOCUMENTS

DE    1022959 B1    1/1958
DE    4414018 A1    11/1994
(Continued)

OTHER PUBLICATIONS

"European Application Serial No. PCT/SE2011/050497, Response filed Feb. 27, 2012 to Written Opinion mailed Aug. 15, 2011", 4 pgs.
"International Application Serial No. PCT/SE2011/050497, International Preliminary Report on Patentability dated Apr. 11, 2012", 9 pgs.
"International Application Serial No. PCT/SE2011/050497, International Search Report mailed Aug. 15, 2011", 8 pgs.
"International Application Serial No. PCT/SE2011/050497, Written Opinion mailed Aug. 15, 2011", 5 pgs.
(Continued)

*Primary Examiner* — Sameh Tawfik
(74) *Attorney, Agent, or Firm* — Schwegman Lundberg & Woessner, P.A.

(57) ABSTRACT

Embodiments include a carton feeding device for feeding cartons to a conveyor track, comprising a pick-up head with a plurality of vacuum cups, an erecting finger pivotally suspended at the pick-up head, where the pick-up head has a pick-up position (P1) and an insertion position (P2), where the carton is held with an angle α between the holding plane of the pick-up head and the bearing surface of the erecting finger, wherein the angle α differs from 90 degrees with at least 10 degrees in the insertion position (P2), where the carton is inserted between two parallel teeth of the conveyor track, and where the distance between the teeth is substantially equal to the width of the upper wall of the carton.

10 Claims, 9 Drawing Sheets

(51) Int. Cl.
  *B65B 43/26* (2006.01)
  *B65B 43/30* (2006.01)
  *B65B 43/32* (2006.01)
  *B31B 50/80* (2017.01)
  *B31B 100/00* (2017.01)
  *B31B 120/30* (2017.01)
  *B31B 50/78* (2017.01)

(52) U.S. Cl.
  CPC ............ *B31B 50/788* (2017.08); *B31B 50/80* (2017.08); *B31B 50/804* (2017.08); *B31B 2100/00* (2017.08); *B31B 2120/30* (2017.08); *B65B 43/325* (2013.01)

(58) Field of Classification Search
  USPC .......................... 493/315, 309, 313, 318, 319
  See application file for complete search history.

(56) References Cited

U.S. PATENT DOCUMENTS

| | | | |
|---|---|---|---|
| 3,956,976 A * | 5/1976 | Vogel et al. | 493/315 |
| 4,011,799 A * | 3/1977 | Chidsey | 493/314 |
| 4,194,442 A | 3/1980 | Martelli | |
| 4,331,436 A | 5/1982 | Kuttenbaum et al. | |
| 4,518,301 A | 5/1985 | Greenwell et al. | |
| 4,537,587 A * | 8/1985 | Langen | 493/315 |
| 4,871,348 A | 10/1989 | Konaka et al. | |
| 4,881,934 A | 11/1989 | Harston et al. | |
| 5,024,640 A * | 6/1991 | Saitoh | 493/127 |
| 5,049,119 A * | 9/1991 | Bershadsky | 493/315 |
| 5,061,231 A | 10/1991 | Dietrich et al. | |
| 5,078,669 A * | 1/1992 | Dietrich et al. | 493/315 |
| 5,102,385 A * | 4/1992 | Calvert | 493/315 |
| 5,215,515 A | 6/1993 | Bershadsky | |
| 5,298,008 A | 3/1994 | Decker et al. | |
| 5,411,464 A * | 5/1995 | Calvert et al. | 493/315 |
| 5,573,490 A | 11/1996 | Steinbrenner et al. | |
| 5,613,828 A | 3/1997 | Haddow et al. | |
| 5,662,577 A | 9/1997 | Reuteler | |
| 5,687,874 A | 11/1997 | Omori et al. | |
| 5,713,187 A * | 2/1998 | Peterson | 53/566 |
| 6,168,149 B1 | 1/2001 | Boldrini et al. | |
| 6,503,180 B1 | 1/2003 | Plueschow et al. | |
| 6,669,616 B1 * | 12/2003 | Bierenacki et al. | 493/316 |
| 6,699,165 B1 | 3/2004 | Krieger et al. | |
| 6,764,436 B1 * | 7/2004 | Mazurek | 493/120 |
| 7,310,925 B2 * | 12/2007 | Monti | B65B 5/024 493/309 |
| 7,328,561 B2 | 2/2008 | Fochler | |
| 7,695,421 B2 | 4/2010 | Ford | |
| 8,686,222 B2 | 4/2014 | Samuel et al. | |
| 2013/0039731 A1 | 2/2013 | Lundgren et al. | |

FOREIGN PATENT DOCUMENTS

| | | |
|---|---|---|
| DE | 10114044 A1 | 10/2002 |
| EP | 0425226 A1 | 5/1991 |
| EP | 0331325 B1 | 6/1992 |
| EP | 0900753 A2 | 3/1999 |
| EP | 1174256 A2 | 1/2002 |
| EP | 0800450 B1 | 10/2003 |
| EP | 1594745 B1 | 10/2006 |
| GB | 846891 A | 8/1960 |
| GB | 2053133 A | 2/1981 |
| GB | 2429965 A | 3/2007 |
| JP | 11-079134 A | 3/1999 |
| JP | 2002-544067 A | 12/2002 |
| JP | 2009-012303 A | 1/2009 |
| JP | 2013-507919 A | 3/2013 |
| WO | WO-00/23325 A1 | 4/2000 |

OTHER PUBLICATIONS

"Machine Translation of DE1022959, issued Jan. 16, 1958", (Specification and Claims), 4 pgs.
"U.S. Appl. No. 13/643,012 , Response filed Dec. 19, 2013 to Non Final Office Action mailed Jul. 19, 2013", 11 pgs.
"U.S. Appl. No. 13/643,012, Final Office Action mailed Jan. 22, 2014", 7 pgs.
"U.S. Appl. No. 13/643,012, Non Final Office Action mailed Jul. 19, 2013", 7 pgs.
"U.S. Appl. No. 13/643,012, Response filed Jun. 13, 2013 to Restriction Requirement May 14, 2013", 5 pgs.
"U.S. Appl. No. 13/643,012, Restriction Requirement mailed May 14, 2013", 6 pgs.
"International Application Serial No. PCT/SE2011/050498, International Preliminary Report on Patentability dated Oct. 30, 2012", 5 pgs.
"International Application Serial No. PCT/SE2011/050498, International Search Report mailed Jun. 27, 2011", 6 pgs.
"International Application Serial No. PCT/SE2011/050498, Written Opinion mailed Jun. 27, 2011", 5 pgs.
"U.S. Appl. No. 13/643,012, Advisory Action mailed Apr. 17, 2014", 3 pgs.
"U.S. Appl. No. 13/643,012, Response filed Apr. 8, 2014 to Final Office Action mailed Jan. 22, 2014", 8 pgs.
"U.S. Appl. No. 13/643,012, Advisory Action dated Aug. 19, 2016", 3 pgs.
"U.S. Appl. No. 13/643,012, Advisory Action dated Sep. 3, 2015", 4 pgs.
"U.S. Appl. No. 13/643,012, Final Office Action dated Jun. 13, 2016", 8 pgs.
"U.S. Appl. No. 13/643,012, Final Office Action dated Jun. 24, 2015", 7 pgs.
"U.S. Appl. No. 13/643,012, Non Final Office Action dated Mar. 1, 2016", 6 pgs.
"U.S. Appl. No. 13/643,012, Non Final Office Action dated Mar. 13, 2015", 5 pgs.
"U.S. Appl. No. 13/643,012, Preliminary Amendment filed Oct. 23, 2012", 6 pgs.
"U.S. Appl. No. 13/643,012, Response filed Jun. 1, 2016 to Non Final Office Action dated Mar. 1, 2016", 9 pgs.
"U.S. Appl. No. 13/643,012, Response filed Jun. 12, 2015 to Non Final Office Action dated Mar. 13, 2015", 9 pgs.
"U.S. Appl. No. 13/643,012, Response filed Aug. 11, 2016 to Final Office Action dated Jun. 13, 2016", 10 pgs.
"U.S. Appl. No. 13/643,012, Response filed Aug. 24, 2015 to Final Office Action dated Jun. 24, 2015", 8 pgs.
"Chinese Application Serial No. 201180021241.9, Second Office Action dated May 22, 2015", (w/English Translation), 9 pgs.
"Indonesian Application Serial No. W00201204211. Office Action dated Jun. 9, 2016", (w/ concise description of relevance), 3 pgs.
"Japanese Application Serial No. 2013-507919, Office Action dated Jan. 5, 2015", (w/ English Translation), 6 pgs.
"U.S. Appl. No. 13/643,012, Non Final Office Action dated Mar. 23, 2017", 8 pgs.
"U.S. Appl. No. 13/643,012, Advisory Action dated Sep. 18, 2017", 3 pgs.
"U.S. Appl. No. 13/643,012, Pre-Appeal Brief filed Oct. 6, 2017", 5 pgs.
"U.S. Appl. No. 13/643,012, Response filed Sep. 6, 2017 to Final Office Action dated Jul. 6, 2017", 12 pgs.
"U.S. Appl. No. 13/643,012, Final Office Action dated Jul. 6, 2017", 8 pgs.
"U.S. Appl. No. 13/643,012, Response filed Jun. 21, 2017 to Non Final Office Action dated Mar, 23, 2017", 10 pgs.
"U.S. Appl. No. 13/643,012, Appeal Brief filed Dec. 6, 2017", 17 pgs.
"U.S. Appl. No. 13/643,012, Examiner's Answer dated Jan. 23, 2018", 7 pgs.
"U.S. Appl. No. 13/643,012, Examiner's Answer dated Feb. 8, 2018", 7 pgs.

* cited by examiner

CARTON FEEDER DEVICE AND METHOD FOR FEEDING A CARTON TO A CONVEYOR TRACK

RELATED APPLICATIONS

This application is a nationalization under 35 U.S.C. §371 from International Application Serial No. PCT/SE2011/050497, filed Apr. 26, 2011 and published as WO 2011/136725 A1 on Nov. 3, 2011, which claims the priority benefit of Sweden Application Serial No. 10504184, filed Apr. 27, 2010, the contents of which applications and publication are incorporated herein by reference in their entirety.

TECHNICAL FIELD

The present invention relates to a carton feeder device for a conveyor track.

BACKGROUND ART

In the industry concerned with packing smaller objects such as tubes, bottles and the like in carton boxes, there is a constant need to increase the productivity of the packing machines. One aspect of a packing machine is the number of units that the machine can handle during a specific time interval. There are different ways of achieving a higher throughput in such a machine. One way is to reduce the cycle time for each object, i.e. to allow more objects to pass the machine during the same time interval. Such a solution is often difficult to achieve since it may involve a redesign of the machine and at some point, it is not possible to reduce the cycle time for a specific operation. Another way to increase the throughput in a production line is to use several parallel machines, at least for some operations. Such a solution requires more space and is not as cost-effective, but may be a possibility when an older production line is to be upgrades.

One type of machine that there may be a need to improve is the machine that pick up pre-glued folded paper cartons, erects them and feeds them to a conveyor track. On the conveyor track, the cartons continue to the next station, in which a tube or the like is inserted into the carton, with or without an instruction leaflet. The side flaps of the carton is then folded and the carton is closed, eventually also sealed, and packed in larger shipping units.

EP 1594745 B1 describes a carton manipulation and feeder apparatus, which is adapted to pick up folded, pre-glued cartons from a hopper, erects them and to feed them to a conveyor track. The cartons are erected to a square shape and are inserted at the infeed end of the conveyor track. The cartons are inserted between lugs attached to the conveyor track and having a distance between them that corresponds to the width of the carton to be inserted. In order to be able to feed the carton to the conveyor track, the carton is inserted at the infeed end of the conveyor track, where the conveyor chain changes direction and is conveyed on a wheel. In this end region of the conveyor track, the lugs are angled apart due to the conveyor wheel, which allows the erected cartons to be inserted between the lugs. When the carton is inserted and the chain has moved somewhat, the lugs will be perpendicular to the conveyor chain again and will hold the carton in position.

EP 0800450 B1 describes another carton transfer assembly adapted to transfer folded cartons from a hopper, open them and transfer them to a conveyor. The cartons are opened by an extensible rod. The opened cartons are inserted in carton pockets provided between chain lugs. The length of the carton pocket is longer than the carton itself, thereby allowing the opened carton to be inserted into the carton pocket during the rotation of the rotary feeder.

U.S. Pat. No. 7,328,561 B2 describes an apparatus for erecting boxes and setting them on a conveyor. The apparatus pick up folded boxes from a magazine, erects them and inserts them into conveyor cells on a conveyor track. The cartons are erected to a square shape by an erecting element and are inserted at the infeed end of the conveyor track. The cartons are inserted between lugs attached to the conveyor track and having a distance between them that corresponds to the width of the carton to be inserted. In order to be able to feed the carton to the conveyor track, the carton is inserted at the infeed end of the conveyor track, where the conveyor chain changes direction and is conveyed on a wheel. In this end region of the conveyor track, the lugs are angled apart due to the conveyor wheel, which allows the erected cartons to be inserted between the lugs. When the carton is inserted and the chain has moved somewhat, the lugs will be perpendicular to the conveyor chain again and will hold the carton in position. The height of the rear lug is substantially lower than the front lug in order to facilitate the insertion of the box. This requires two lugs for each box.

U.S. Pat. No. 5,573,490 describes an apparatus for erecting a folding box and folding its closure tabs before it is transferred into a conveyor device. The insertion of the erected boxes into the conveyor device is not described.

U.S. Pat. No. 4,331,436 describes a device for erecting and counter collapsing boxes from preformed blanks. The erected box may then be fed to a conveyor belt having compartment dividers adapted to hold the boxes. The boxes enter at the infeed end of the conveyor belt, where the conveyor belt changes direction and is conveyed on a wheel. In this end region of the conveyor belt, the compartment dividers are angled apart due to the conveyor wheel, which allows the erected boxes to enter between the compartment dividers.

EP 0331325 B1 describes a rotary transfer mechanism which is adapted to pick flat, collapsed cartons from a magazine. The cartons are picked from the magazine by a pick head having suctions cups. The cartons may open slightly during the removal from the magazine, but the cartons are substantially in their collapsed condition when the insertion of the carton into the conveyor begins. During the insertion, the leading corner hits a leading flight of the conveyor and since the pick head moves faster than the conveyor, the carton is pulled against the leading flight of the conveyor and is thus pulled open. In this way, a folded carton can be inserted between two parallel flights of the conveyor. There are several problems associated with this solution. One problem is that the carton is driven into the leading flight and is pulled against the leading flight during the opening of the carton. This will put a great deal of strain on the carton, which may lead to damages to the outer surfaces of the carton. Since the distance over which the carton is opened is relatively short, the strain on the carton is further increased. A further disadvantage may be to handle cartons in which residual glue inside the carton causes the sides of the carton to stick to each other. Such a carton may be further damaged during the opening and may also disrupt the insertion of further cartons.

These solutions may work well for some applications, but may be inflexible, especially when the throughput of the system is to be increased. There is thus room for improvements.

DISCLOSURE OF INVENTION

An object of the invention is therefore to provide a carton feeding device which can insert an erected carton between two parallel conveyor teeth.

A further object of the invention is to provide an insertion station comprising a plurality of carton feeding devices. A further object of the invention is to provide a method for feeding cartons to a conveyor track having parallel retaining teeth spaced apart with a distance that is equal to an erected carton.

The solution to the problem according to the invention is described in the characterizing part of claim 1. Claim 11 contains an advantageous insertion station. Claim 13 contains an advantageous method. The other claims contain advantageous embodiments and further developments of the carton feeding device.

In a carton feeding device for feeding cartons to a conveyor track, comprising a pick-up head with a plurality of vacuum cups, and an erecting finger pivotally suspended at the pick-up head, where the pick-up head has a pick-up position in which the holding plane of the pick-up head is positioned parallel to the folded carton blank that is to be picked up, and an insertion position in which the erecting finger is pivoted with respect to the holding plane of the pick-up head in such a way that the carton is opened, and where the carton is held with an angle $\alpha$ between the vacuum cups and the bearing surface of the erecting finger, and where the pick-up head holds the carton by an upper wall, the object of the invention is achieved in that the angle $\alpha$ differs from 90 degrees with at least 10 degrees in the insertion position, that the carton is inserted between two parallel teeth of the conveyor track, and that the distance between the teeth is substantially equal to the width of the upper wall of the carton.

By this first embodiment of the carton feeding device according to the invention, a carton feeding device is obtained that can insert cartons into a continuously moving conveyor track with parallel teeth, where the distance between the teeth corresponds to the width of an erected carton. This is achieved in that the cartons are held in a rhombic shape during the insertion. The rhombic shape of the cartons decreases the horizontal extension of the cartons during the insertion and provides some space between the cartons and the teeth. This space constitutes the tolerance that is needed to be able to insert a carton in a holding space with the same width as the carton itself.

One advantage of being able to insert cartons when the teeth are parallel is that the cartons may be inserted on the straight conveyor track and not only at the infeed region at the end of the conveyor track. This in turn makes it possible to mount several feeding devices next to each other along the conveyor track. The feeding devices can then insert cartons simultaneously which allows for an increased throughput rate of the feeding system.

The rhombic shape of the carton is preferably such that the angle $\alpha$, which is the angle between the upper wall and one of the side walls of the carton, is in the region between 50 and 80 degrees, and more preferably between 60 and 70 degrees. It is preferred to counterfold the cartons prior to the insertion, i.e. to open the cartons by more than 90 degrees, preferably in the region of between 100 to 140 degrees. This is of advantage since the carton will then be pre-tensioned towards a rectangular shape, instead of towards the original flat-folded shape. This in turn will make it easier to hold the erected carton in the conveyor track. A holding protrusion may be provided at one or both of the teeth in order to hold the carton in position. When the carton is inserted into the conveyor track, a hold down element may be used to stop the carton from escaping the conveyor track.

BRIEF DESCRIPTION OF DRAWINGS

The invention will be described in greater detail in the following, with reference to the embodiments that are shown in the attached drawings, in which.

MODES FOR CARRYING OUT THE INVENTION

Figure 1:
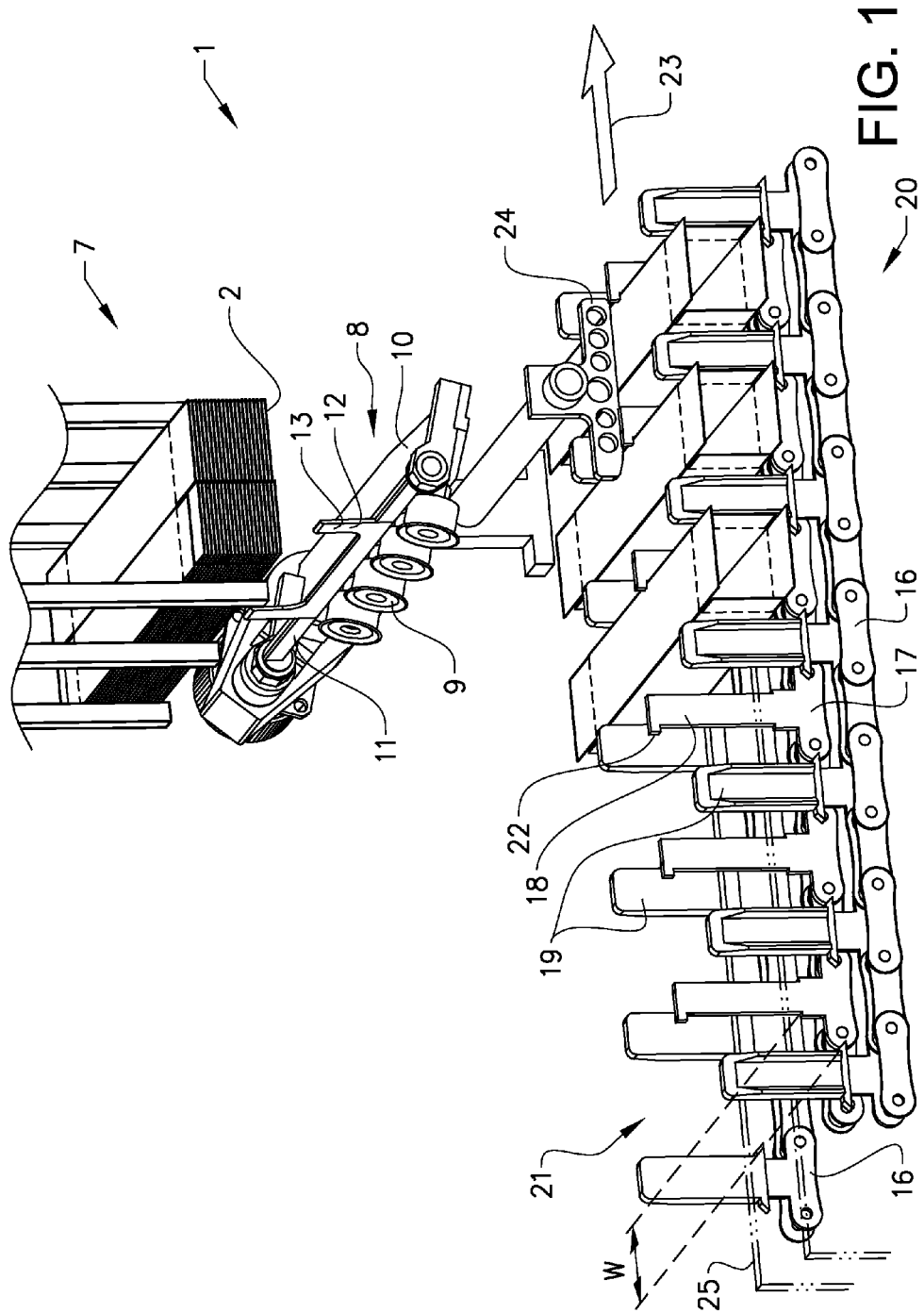
FIG. 1 shows a carton feeding device according to the invention in a position before the pick-up of a carton.

The embodiments of the invention with further developments described in the following are to be regarded only as examples and are in no way to limit the scope of the protection provided by the patent claims. Rectangular cartons are used in the examples. Quadratic cartons may of course also be fed by the carton feeding device.

FIGS. 1 to 6 shows a first embodiment of a carton feeding device 1 adapted to pick-up carton blanks from a magazine, to open them and to subsequently feed them to a conveyor track. The carton blanks are flat-folded, pre-glued cartons 2 comprising four sides and having closure flaps at their end regions. When a carton blank is erected or opened, a rectangular box body is obtained, into which an object such as a tube or bottle is to be inserted, before the box is closed and/or sealed. The sides of the carton 2 will in this description be referred to as the upper wall 3, the lower wall 4, the front wall 5 and the rear wall 6. These references indicate the directions of the sides of a carton being conveyed in the conveyor track, with reference to the moving direction of the conveyor track. The carton blanks are fed from a magazine 7. In this example, the magazine is vertically disposed such that the carton blanks are removed downwards from the magazine, but other positions and angles are also possible.

Figure 7:
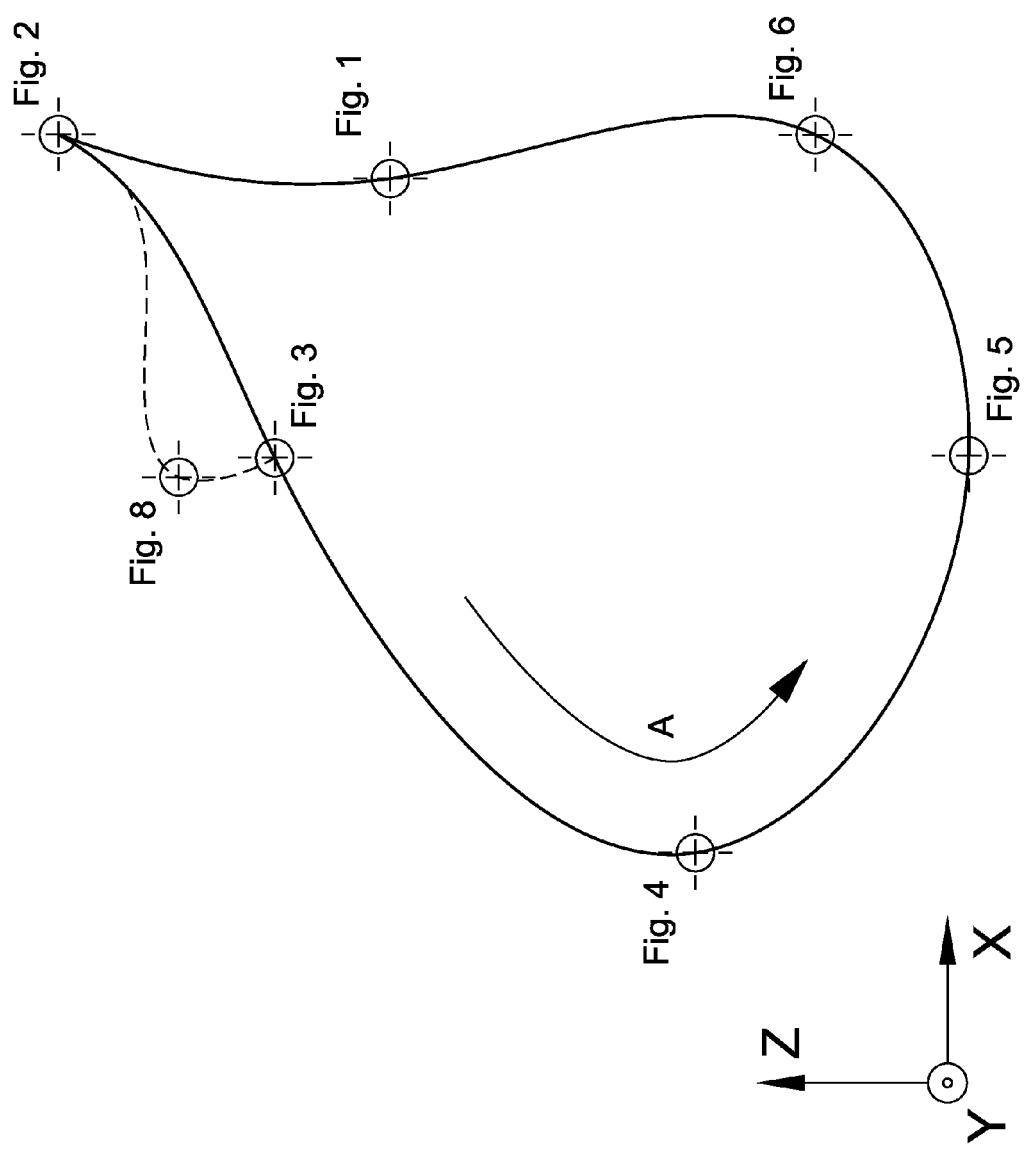
FIG. 7 shows an example of a movement path of the pick-up head.
Figure 8:
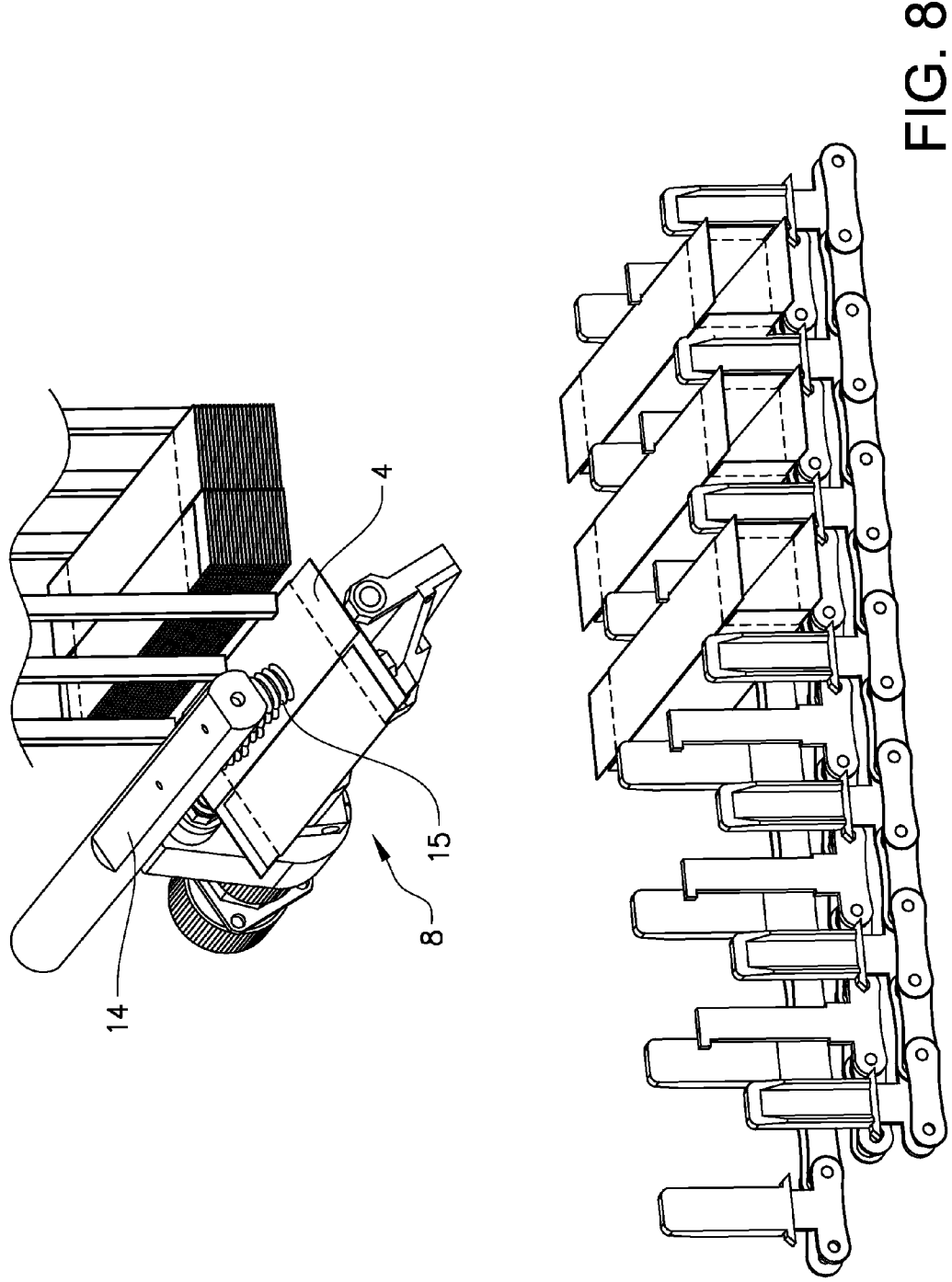
FIG. 8 shows a carton feeding device according to the invention with an optional carton opening head.

In FIG. 1, the carton feeding device is shown in a position just before a carton blank is to be picked up by the carton feeding device. The carton feeding device comprises a pick-up head 8 having a base part 10 provided with a plurality of vacuum cups 9, in the shown example four vacuum cups. The front of the vacuum cups 9 make up a holding plane of the pick-up head. An erecting shaft 11 is pivoted to the base part 10. The erecting shaft is provided with one or more erecting fingers 12, each having a bearing surface 13. The bearing surface 13 may be provided on the complete erecting finger 12 or on the front part of the finger. The bearing surface will bear on a side of a carton during the erection of the carton. The pick-up head 8 is rotatably mounted to two linearly journalled sledges, one sledge that moves in the horizontal direction and another sledge that moves in the vertical direction and that is mounted to the horizontal sledge (not shown), that will move the pick-up head 8 between the pick-up position P1, in which the carton is picked up, and the insertion position P2, in which the erected carton is released and inserted in the conveyor track. In the shown example, the pick-up head moves along a continuous, somewhat drop-shaped path. An example of such a path is shown in FIG. 7. The two independently controlled sledges allows for an easy adjustment or adaptation of the movement path, depending on the type and/or size of the carton and the speed of the conveyor track. By moving the pick-up head with a carton along a continuous path, a smooth and quick movement of the carton is obtainable. When the pick-up head 8 moves from the pick-up position to the insertion position, the holding plane of the pick-up head is in the shown example at the same time rotated by approximately 150 degrees. The erecting shaft is at the same time rotated with respect to the pick-up head by a predefined angle, such that the carton is erected during the transfer from the pick-up position to the insertion position.

In FIG. 1, the magazine 7 is also shown. In the shown example, the magazine is disposed vertically such that the cartons are removed from the lower side of the magazine. One advantage of having a vertical magazine is that there is no need for feeding arrangements of any kind, since the gravity will feed the carton blanks to the magazine mouth. This will also simplify the refill of the magazine, since no hindering parts must be removed before the refilling. Another advantage of using a vertical magazine is that several carton feeding devices may be used next to each other without interfering with each other. The magazine may be angled somewhat or the cartons in the magazine may be angled somewhat in order to simplify the pick-up by the pick-up head.

FIG. 1 also shows a conveyor track 20 having protruding teeth extending from the surface of the conveyor track. In this example, the conveyor track comprises two conveyor chains, an outer conveyor chain 16, in this example consisting of two chains that travel fixed to each other, and an inner conveyor chain 17 that travels together with the outer chain. In the shown example, the inner chain is made up by one chain but two chains are also common. The outer chain is provided with trailing teeth 19 that will support the rear walls of the carton. The inner chain is provided with leading teeth 18 that will support the front walls of the cartons. The distance w between two parallel trailing teeth 19 and a leading tooth 18, i.e. the relation between the outer and the inner chain, may be changed in order to allow for cartons of different sizes. Between the trailing teeth 19 and the leading tooth 18, a holding space 21 for a carton is created, in which the carton is inserted and further conveyed. The distance w corresponds to the width of the erected carton, i.e. the width of the upper wall. The use of a distance between the teeth that is the same as the width of the carton ensures that the cartons are securely held in place by the teeth during the subsequent insertion of an object into the carton. A hold down element 24 is arranged to stop the inserted cartons from escaping upwards, out of the holding space. The moving direction of the conveyor track is indicated by an arrow 23. In the conveyor track, two longitudinal rails 25 are arranged between the teeth in the lengthwise direction of the conveyor track. The height of the rails is adjustable in order to adapt the conveyor track for differently sized cartons. The cartons will ride on the rails when they are inserted in the conveyor track.

Figure 2:
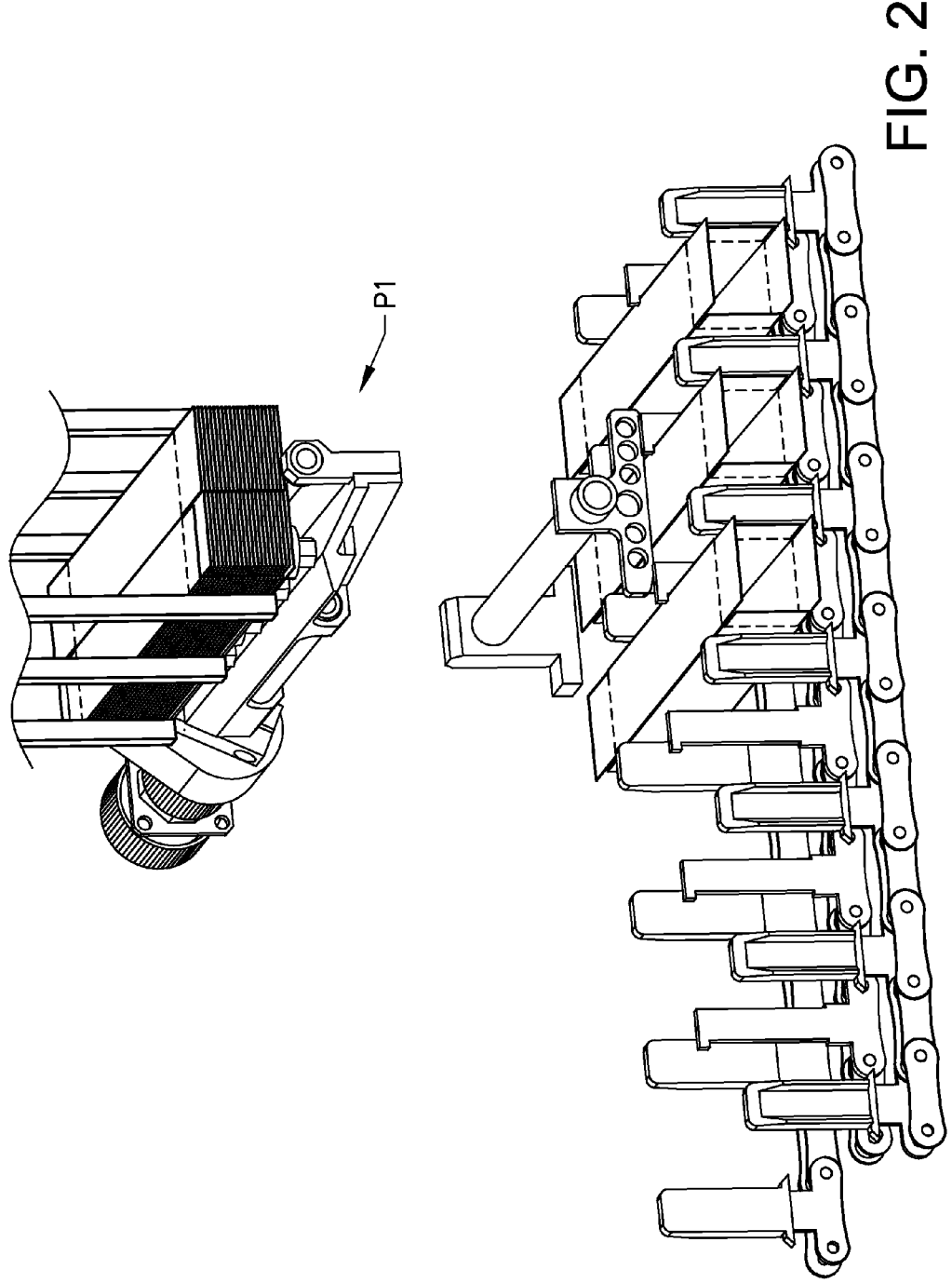
FIG. 2 shows a carton feeding device according to the invention in a pick-up position.

In FIG. 2, the carton feeding device is in the pick-up position P1. In this position, the holding plane of the pick-up head, i.e. the vacuum cups 9, will bear on the upper wall 3 of the lowermost carton blank 2 in the magazine. A negative pressure is applied to the vacuum cups through suitable conduits connecting the vacuum cups to a negative pressure source. The negative pressure is controlled by a valve that in turn is controlled by the control system of the carton feeding device. The negative pressure applied to the vacuum cups will pull the carton blank out of the magazine when the pick-up head 8 continues to move. At the same time, the bearing surface of the erecting fingers will bear on the rear wall 6 of the carton blank. The bearing surface may also be positioned close to the rear wall without touching the rear wall in this position. In this example, the vacuum cups and the bearing surface of the erecting fingers are aligned with each other in substantially the same plane, which is parallel with the carton blanks arranged in the magazine.

Figure 3:
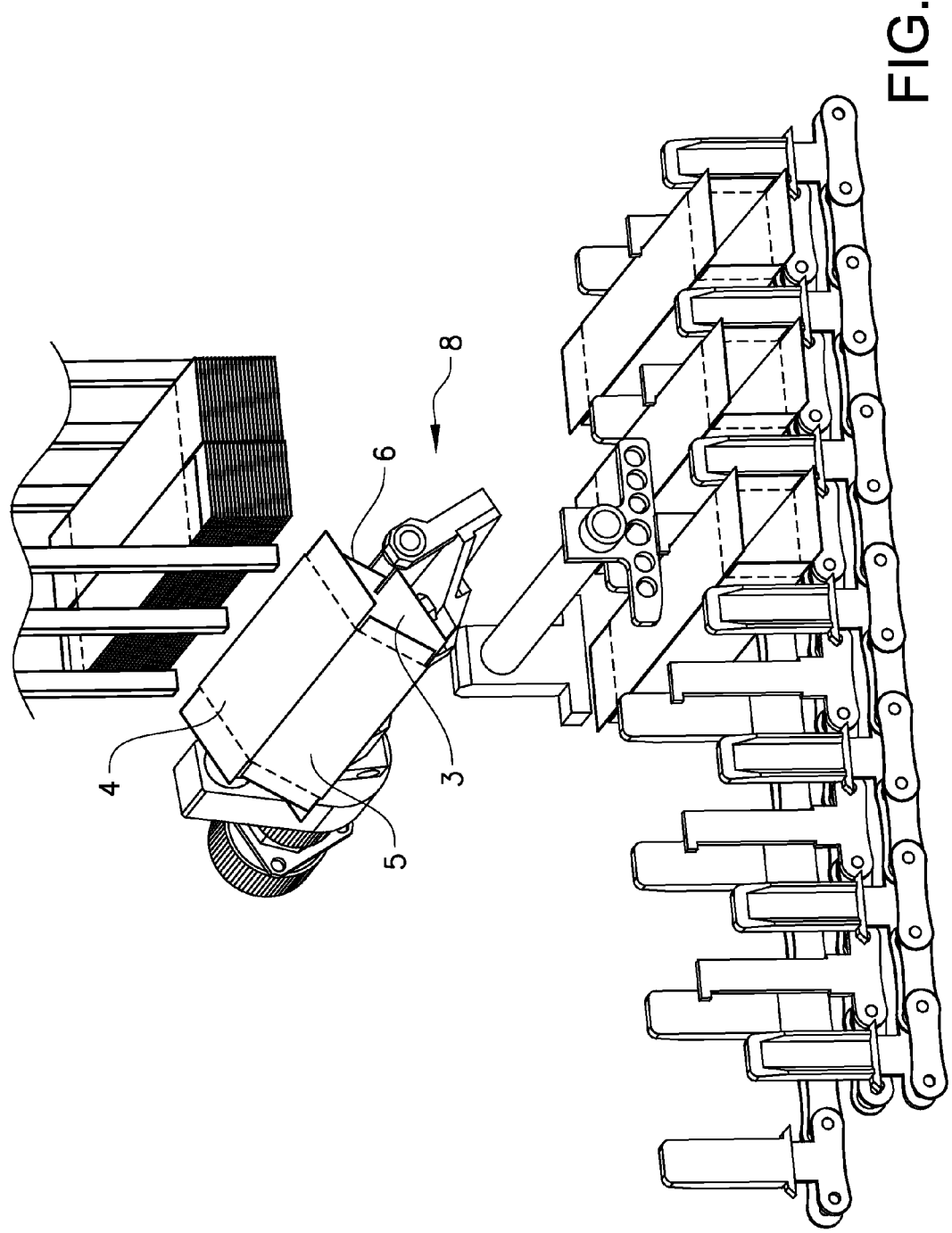
FIG. 3 shows a carton feeding device according to the invention in a first intermediate position.
Figure 4:
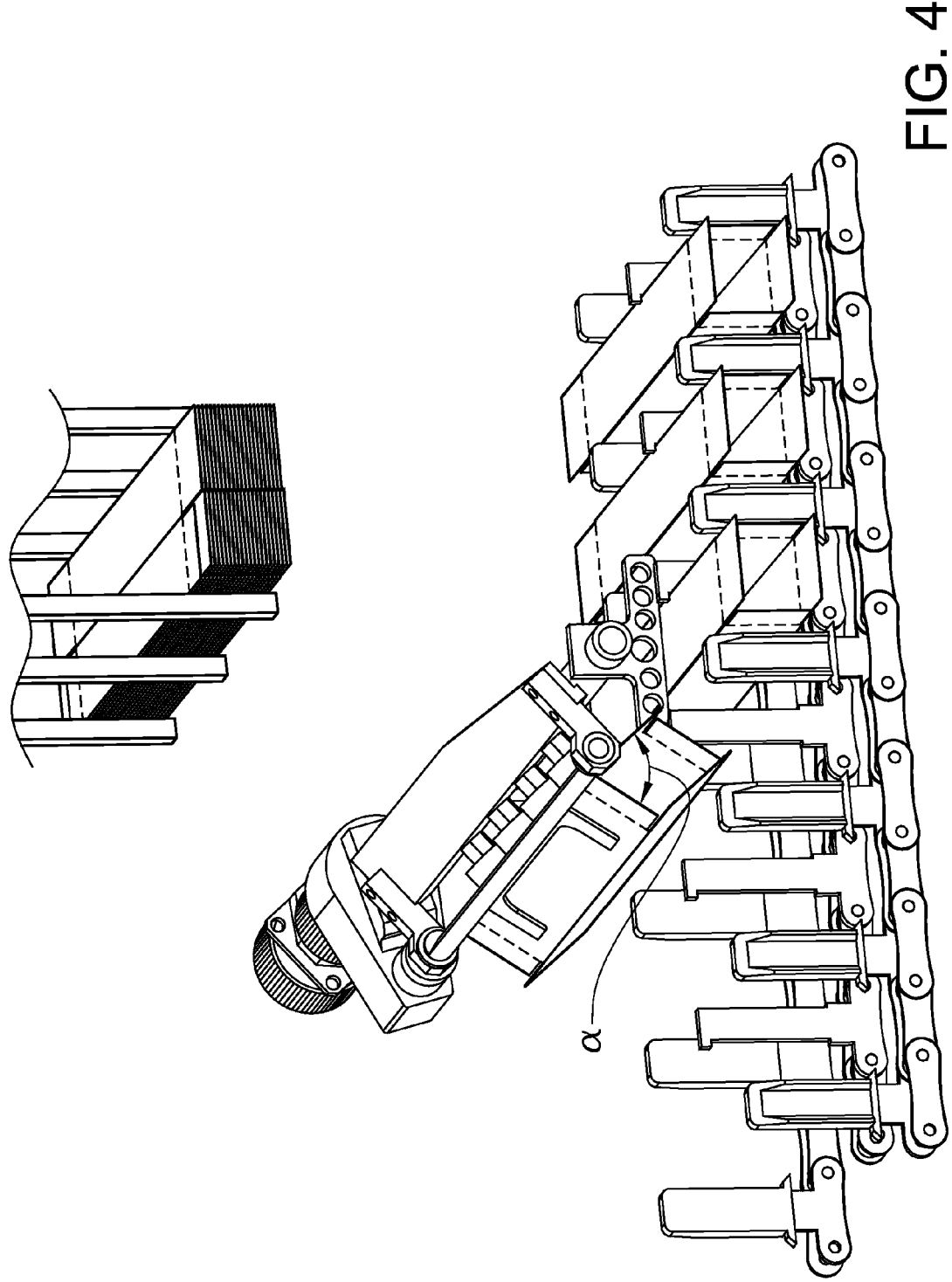
FIG. 4 shows a carton feeding device according to the invention in a second intermediate position.

When the carton blank is extracted from the magazine, the pick-up head 8 continues the movement towards the insertion position. During this movement, the erecting fingers will rotate relative the pick-up head, such that the angle between the holding plane of the vacuum cups and the bearing surface of the erecting fingers will decrease. The angle between the holding plane of the vacuum cups and the bearing surface of the erecting fingers will be referred to as angle $\alpha$. In FIG. 3, a first intermediate position is shown, in which the carton is partly opened. In this position, angle $\alpha$ is around 150 degrees. The pick-up head moves in a direction against the moving direction 23 of the conveyor track during the first part of the movement path, approximately down to the position as shown in FIG. 4. FIG. 4 shows a second intermediate position of the pick-up head. In this position, the pick-up head starts to move in the same direction as the conveyor track and continue to move downwards somewhat. The carton is now completely open, and is in this example even counterfolded such that the angle $\alpha$ is smaller than 90 degrees and that the carton displays a rhombic shape.

In FIG. 7, an example of the movement path of the pick-up head is shown, with respect to the centre axis of the erecting shaft. The positions correspond to the positions shown in FIGS. 1 to 6 and 8. The pick-up head moves in the direction indicated by the arrow A.

Figure 5:
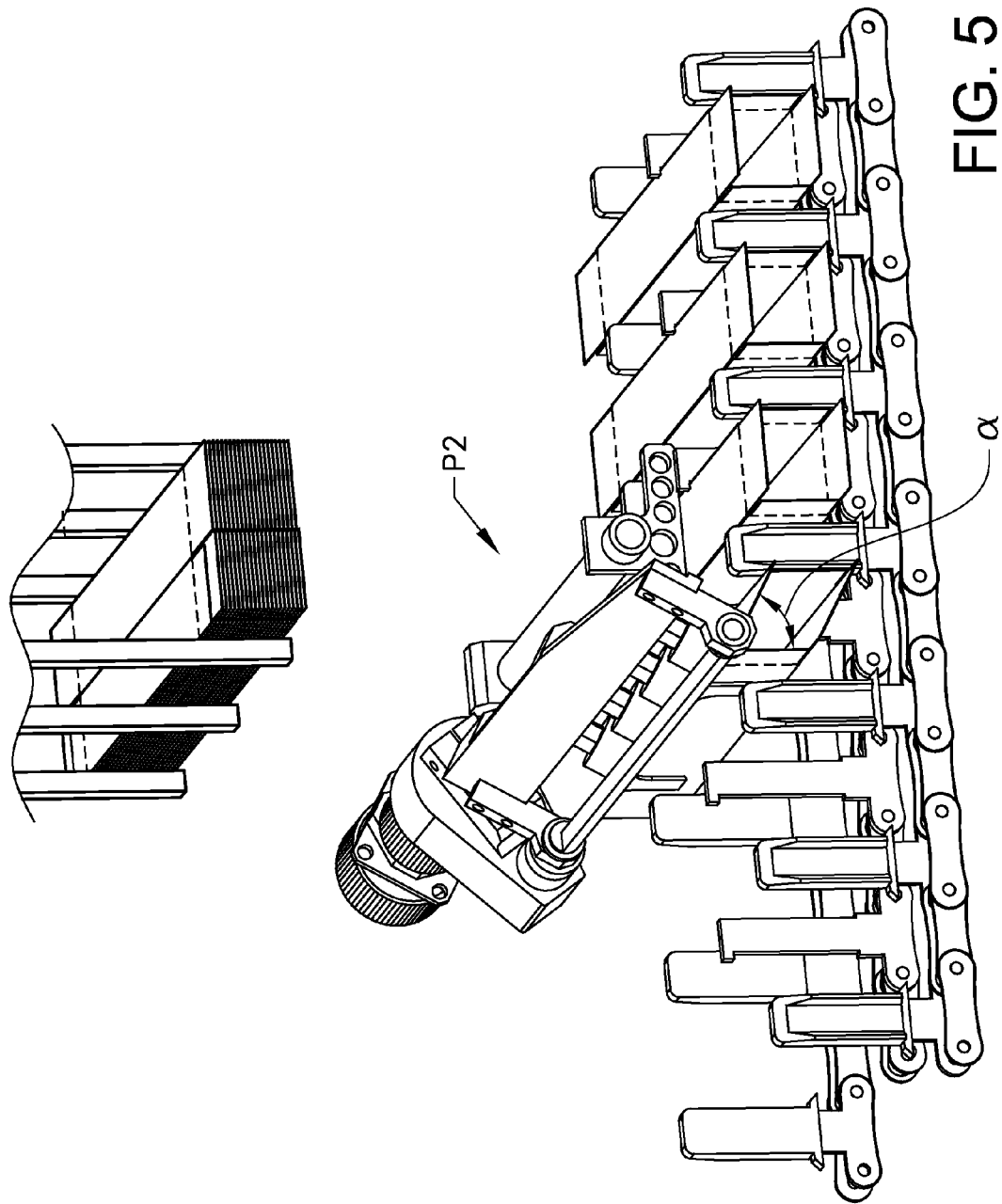
FIG. 5 shows a carton feeding device according to the invention in an insertion position.

From the position shown in FIG. 4, the pick-up head continues to the insertion position shown in FIG. 5. At the same time, the carton is counterfolded somewhat more, such that the angle $\alpha$ lies in the region between 50 and 80 degrees, and preferably around 60 degrees. By counterfolding the carton in this way, the distance between the front wall 5 and the rear wall 6 of the carton will decrease. The front wall 5 and the rear wall 6 are preferably substantially vertical in the insertion position. This will in turn allow the carton to be inserted into the holding space of the conveyor track. At the same time, the pick-up head 8 is held with the holding plane at an angle to the plane of the conveyor track. This angle is approximately 30 degrees in the insertion position for the shown example, and is preferably in the range between 10 and 40 degrees. The movement of the pick-up head is synchronized with the movement of the conveyor track in order to allow the cartons to be inserted in a smooth and reliable way. The conveyor track moves continuously at a constant speed. This ensures a high throughput rate.

There are several problems to overcome when an opened carton is to be inserted between two teeth on a conveyor track that moves continuously. One problem is that the insertion tool must move with substantially the same speed as the conveyor track. Another problem is that the position of the insertion tool must correspond exactly to the position of the holding space between the teeth where the carton is to be inserted. A further problem is that the insertion tool must follow that position during the complete insertion cycle and at the same time lower the carton into the holding space. All of these requirements must be fulfilled at a high speed and with a high repeatability. Different approaches are used to overcome these problems. The most common one is to insert the cartons at the infeed region of the conveyor track, where the teeth are angled away from each other, creating a larger opening into which the carton is inserted. When the teeth are parallel again, the carton will be held securely in position. Another solution would be to increase the distance between the teeth, i.e. to increase the tolerances for the insertion, in order to allow the conveyor track to move some during the insertion. The disadvantage of this is that the carton is not held in a secure and predefined position on the conveyor track. Another solution would be to stop or slow down the conveyor track during the insertion. Such a solution will decrease the throughput.

In present solutions, systems are known that allows for up to 700 insertions per minute when the insertions are made at the infeed region of the conveyor track. It has proven difficult to increase this number substantially.

Another problem that arises when the number of cartons that are to be inserted into a conveyor track is increased, is the feeding of cartons to the pick-up head from the magazine. When feeding all the cartons from a single magazine, it is difficult to provide constant feeding properties for the carton. The pressure on the carton stack varies with the number of cartons, which affects the feeding of a carton to the feeding position. Since the lead time for picking up a carton is decreased, the timing for the vacuum cups is more sensitive which in turn makes it more difficult to provide an accurate pick-up of a carton. A shorter pick-up time calls for a lower holding force of the carton in the magazine, but a decrease in the holding force will affect the repeatability of the feeding of cartons. It is therefore an advantage to divide the feeding of cartons to several magazines. This will allow for a proper and accurate pick-up of a carton with a high repeatability.

In the present invention, the insertion of a carton is made between two teeth that are parallel, that moves continuously and that will be able to hold the carton securely after the insertion, i.e. where the distance between the teeth corresponds to the size of the erected carton. The insertion of a carton into a continuously moving conveyor track is realised by the pick-up head moving along the conveyor track during the insertion and by the carton being folded to a rhombic shape during the insertion. The rhombic shape allows the carton to be inserted between the teeth, leaving some tolerance between the carton walls and the teeth of the conveyor track for the insertion to take place.

The pick-up head with a carton that is inserted into the holding space of the conveyor track is shown in FIG. 5. The insertion starts in the position shown in FIG. 4, where the pick-up head starts to move along the conveyor track. At the same time, the lower part of the erected carton reaches down between the teeth. The pick-up head continues the movement downwards until the lowermost position, as shown in FIG. 5, is reached. In this insertion position P2, the carton is inserted in the holding space by the pick-up head and will bear on the rails 25. The carton is consequently released from the pick-up head by removing the negative pressure from the vacuum cups. To help the release of the carton from the pick-up head, and to stop the carton from escaping the conveyor track upwards, a hold down element 24 is arranged above the conveyor track. The hold down element is mounted to the horizontal sledge of the pick-up head and moves with the pick-up head in the horizontal direction, thereby assisting the insertion of the carton. If required, the hold down element may also push the carton down somewhat in the conveyor track.

Figure 6:
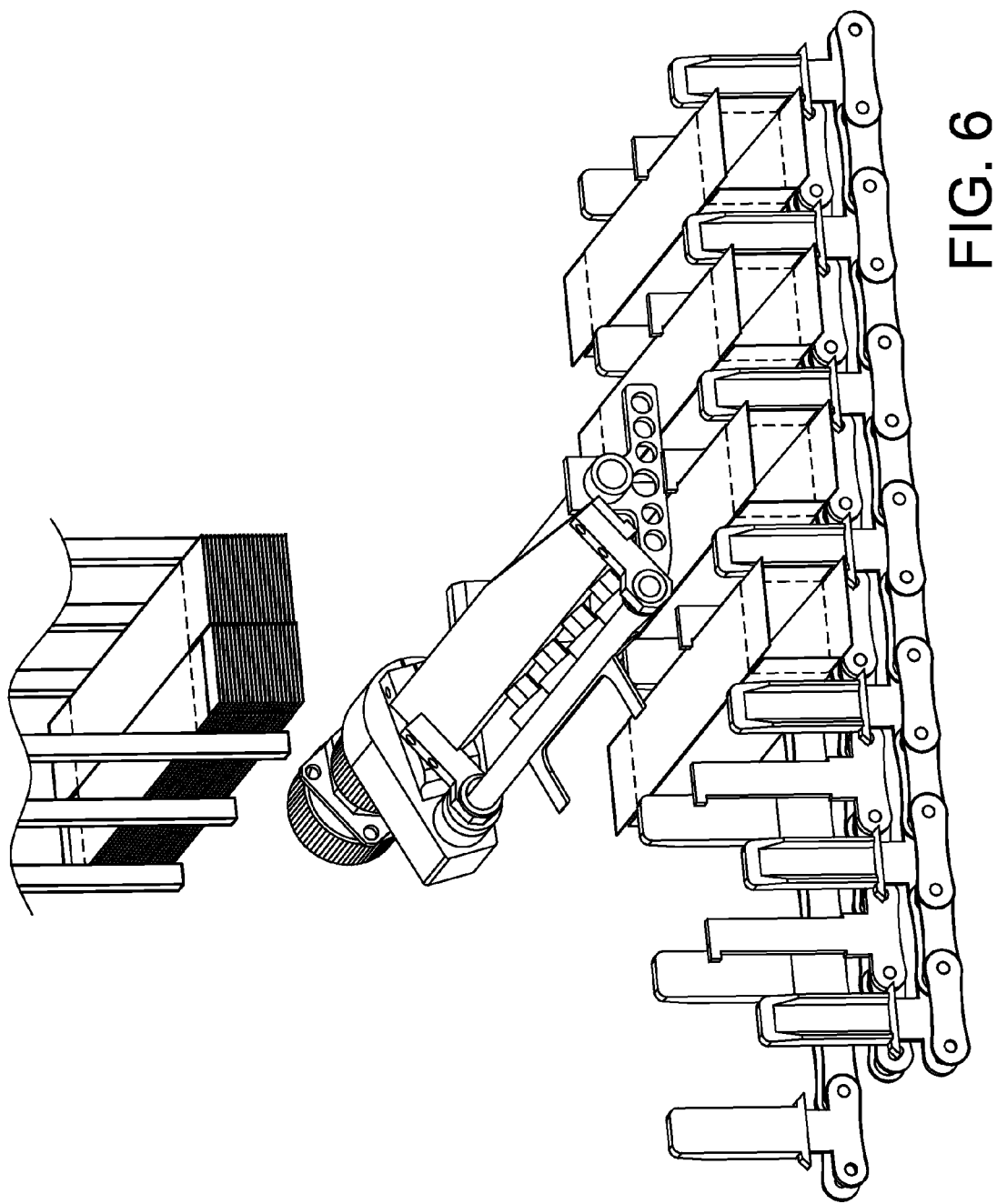
FIG. 6 shows a carton feeding device according to the invention in a position after the insertion of a carton.

The pick-up head will move with more or less the same speed as the conveyor track, in the moving direction of the conveyor track, between the position as shown in FIG. 4 and the position as shown in FIG. 6. There may be a small acceleration at the beginning of this movement, but since the carton is held in a rhombic shape, there is enough tolerance between the teeth and the carton to allow this without damaging the carton. The speed will be substantially constant from the position as shown in FIG. 4 and to at least the position in which the carton is released from the pick-up head and the erecting fingers.

In the shown example, the carton is counterfolded by 30 degrees, and a suitable range for the counterfolding is between 10 to 40 degrees, depending e.g. on the speed of the conveyor track. The carton will thus have some built-in tension that will force the carton back to its rectangular shape. The carton will thus, either alone or with the aid of the hold down element, obtain its rectangular shape when it is released from the pick-up head and the erecting fingers. Since the distance w between the teeth corresponds to the size of the rectangular carton, the carton will thus be held in a secure position by the conveyor track. The leading teeth 18 may also be provided with a protrusion 22 at the top of each tooth that will help to hold the carton in position. In the shown example, where the carton is counterfolded, the protrusion points towards the holding space of the conveyor track. In this way, the carton will not be able to spring back due to the built-in tension. Depending on the way the carton is erected and inserted, the protrusions may also be provided at the trailing teeth of the conveyor track.

When the carton is released from the pick-up head, it continues to travel with the conveyor track and the pick-up head continues its movement along the path shown in FIG. 7. FIG. 6 shows the pick-up head in a position where the carton is released and the pick-up head is on its way to the pick-up position.

Figure 9:
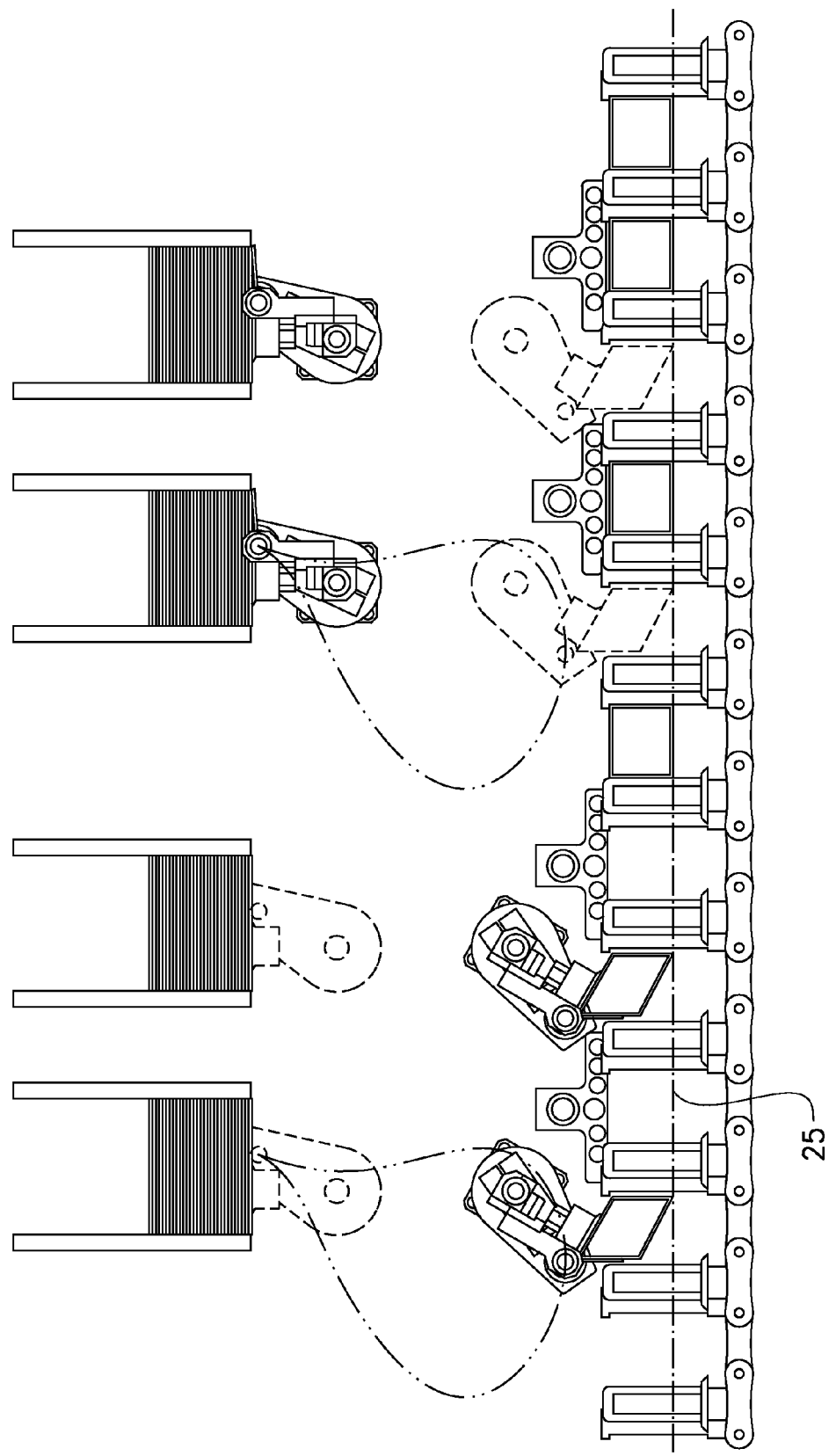
FIG. 9 shows an insertion station comprising four carton feeding devices according to the invention.

The shown carton feeding device is capable of reaching an insertion rate of up to 150 insertions per minute. When a higher insertion rate is desirable, the inventive carton feeding device is well suited to be assembled in groups of several carton feeding devices, thus allowing the insertion rate to increase. The carton feeding device is relatively compact in the lengthwise direction, i.e. along the travel direction of the conveyor track. It is thus possible to mount several carton feeding devices next to each other. When several carton feeding devices are mounted next to each other in a group, every second holding space may be inserted with a carton at the same time since the spacing between two carton feeding devices corresponds to the spacing between every second holding space. By mounting two groups of carton feeding devices next to each other, all holding spaces of the conveyor track may be filled. FIG. 9 shows an example of an insertion station comprising four carton feeding devices, mounted in two groups with two carton feeding devices each.

In one preferred example, an insertion station comprising eight carton feeding devices, mounted in two groups with four carton feeding devices each is used. This will resemble the example shown in FIG. 9, the only difference being that eight carton feeding devices are used. In such an example, each carton feeding device is capable of inserting e.g. 125 cartons per minute, which results in a complete insertion station capable of inserting 1000 cartons per minute. The first group inserts a carton in every second holding space and the second group inserts a carton in every other holding space. In this way, a compact, fast and reliable insertion station is obtained.

In some cases, the glue that glues the carton together may also cause the carton blank to stick some such that it will be more difficult to erect the carton. The erecting fingers may then not be able to erect the carton without damage to the exterior of the carton. For this reason, the carton feeding device may be provided with an opening head 14, shown in FIG. 8, which will pre-open the carton. The opening head is in the shown example positioned at a fixed position and is provided with a plurality of vacuum cups 15 to which a negative pressure is applied in order to pre-open the carton. The movement path of the pick-up head is in this example adapted such that the lower wall 4 of the carton blank comes in contact with the vacuum cups 15. At the same time, a negative pressure is applied to the vacuum cups. When the pick-up head moves downwards somewhat, the vacuum cups 15 will hold the lower wall in a fixed position. Since the upper wall 3 is held by the vacuum cups 9 of the pick-up head, the carton will break up even if there is some residual glue in between the inner surfaces of the carton blank. The negative pressure of the vacuum cups 15 is then released and the erecting fingers start acting on the rear wall 6. The adapted movement path of the pick-up head is shown as a dashed line in FIG. 7. It is also possible to mount the opening head on a movable bracket such that the opening head can follow the movement of the carton to some extent during the opening of the carton.

In a second embodiment of the inventive carton feeding device, the erecting fingers will erect the carton blanks by an angle of less than 90 degrees. In this embodiment, a carton is not opened completely before it is inserted into the holding space of the conveyor track. The angle α between the plane of the vacuum cups and the bearing surface of the erecting fingers is in this embodiment between 100 and 140 degrees, and is preferably around 120 degrees. In this embodiment, the hold down element 24 is essential, since the pre-tension in the carton will be in the direction to return the partly opened carton to the carton blank state, i.e. to retract. Protrusions 22 on the teeth may also be provided in this embodiment in order to hold the carton in position.

The invention is not to be regarded as being limited to the embodiments described above, a number of additional variants and modifications being possible within the scope of the subsequent patent claims. It would e.g. be possible to position the erecting fingers on the other side of the pick-up head, i.e. to mirror-invert the pick-up head.

REFERENCE SIGNS

1: Carton feeding device
2: Carton
3: Upper wall
4: Lower wall
5: Front wall
6: Rear wall
7: Magazine
8: Pick-up head
9: Vacuum cup
10: Base part
11: Erecting shaft
12: Erecting finger
13: Bearing surface
14: Opening head
15: Vacuum cup
16: Outer chain
17: Inner chain
18: Leading tooth
19: Trailing tooth
20: Conveyor track
21: Holding space
22: Protrusion
23: Moving direction
24: Hold down element
25: Rail

The invention claimed is:

1. A carton feeding device for feeding cartons having at least a front wall and a rear wall to a continuously moving conveyor track, comprising:
   a pick-up head with a plurality of vacuum cups and an erecting finger pivotally suspended at the pick-up head, where the pick-up head is moveable between:
   a pick-up position (P1) in which a holding plane of the pick-up head is positioned parallel to the folded carton blank that is to be picked up, and
   an insertion position (P2) in which the erecting finger is pivoted with respect to the holding plane of the pick-up head wherein movement of the pick-up head from the pick-up position (P1) to the insertion position (P2) causes the carton to be opened, and where the carton is held, while the pick-up head is in the insertion position (P2), with an angle α between the holding plane of the pick-up head and a bearing surface of the erecting finger, and where the pick-up head holds the carton by an upper wall, wherein the angle α, at the insertion position (P2) is a specific angle that is greater or lesser than 90 degrees by at least 10 degrees in the insertion position (P2),
   wherein the carton feeding device is to insert the carton, while the pick-up head is in the insertion position (P2) with the angle α at the specific angle that is greater than 100 degrees or lesser than 80 degrees, between two teeth of the conveyor track while the two teeth are oriented parallel to each other and where the distance between the teeth is equal to the width w of the upper wall of the carton such that the front wall and rear wall of the carton is vertical and abuts a front tooth of the parallel teeth during the insertion of the carton,
   wherein the pick-up head moves continuously along the conveyor track during the insertion of the carton.

2. The device according to claim 1, wherein the angle α is between 50 and 80 degrees in the insertion position (P2).

3. The device according to claim 2, wherein the angle α is between 60 and 70 degrees in the insertion position (P2).

4. The device according to claim 1, wherein the angle α is between 100 and 130 degrees in the insertion position (P2).

5. The device according to claim 4, wherein the angle α is between 110 and 120 degrees in the insertion position (P2).

6. The device according to claim 1, wherein a leading tooth of the conveyor track comprises a protrusion at an upper end.

7. The device according to claim 1, wherein the device further comprises a hold down element above the conveyor track which moves with the pick-up head in the horizontal direction.

8. The device according to claim 1, wherein the device further comprises an opening head provided with vacuum cups.

9. The device according to claim 1, wherein the speed of the pick-up head is substantially the same as the conveyor track in the moving direction of the conveyor track during the insertion of a carton.

10. The device according to claim 1, wherein the pick-up head is to move from the pick-up position (P1) to the insertion position (P2) by moving to a position with an angle greater than 100 degrees before returning to the specific angle α.

* * * * *